US012651050B1

(12) United States Patent
Boshra et al.

(10) Patent No.: US 12,651,050 B1
(45) Date of Patent: Jun. 9, 2026

(54) BIOMETRIC EYE AUTHENTICATION USING ADAPTIVE DECISION THRESHOLDS AND/OR NORMALIZING DISTANCES

(71) Applicant: Apple Inc., Cupertino, CA (US)

(72) Inventors: Michael Boshra, San Jose, CA (US); Saurabh Jain, Fremont, CA (US); Martin Haller, Mountain View, CA (US); Tomi P Maila, San Jose, CA (US); Abhishek Nagar, Everett, WA (US)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 18/654,682

(22) Filed: May 3, 2024

Related U.S. Application Data

(60) Provisional application No. 63/506,001, filed on Jun. 2, 2023.

(51) Int. Cl.
*G06F 21/32* (2013.01)
*G06V 40/18* (2022.01)

(52) U.S. Cl.
CPC ............ *G06F 21/32* (2013.01); *G06V 40/193* (2022.01); *G06V 40/197* (2022.01)

(58) Field of Classification Search
None
See application file for complete search history.

(56) References Cited

U.S. PATENT DOCUMENTS

| | | | | |
|---|---|---|---|---|
| 9,836,663 | B2 * | 12/2017 | Yun | ..................... G02B 27/017 |
| 2016/0342782 | A1 * | 11/2016 | Mullins | .............. G02B 27/0176 |
| 2017/0235931 | A1 | 8/2017 | Publicover | |

| | | | | |
|---|---|---|---|---|
| 2017/0256110 | A1 * | 9/2017 | DiVincent | ................ G07C 9/37 |
| 2019/0180128 | A1 | 6/2019 | Han | |
| 2019/0266399 | A1 | 8/2019 | Kanamori | |
| 2019/0370450 | A1 | 12/2019 | Fletcher | |
| 2020/0356648 | A1 | 11/2020 | Odinokikh | |
| 2020/0364441 | A1 | 11/2020 | O'sullivan | |
| 2021/0365533 | A1 | 11/2021 | Kaplan | |

FOREIGN PATENT DOCUMENTS

| | | |
|---|---|---|
| CN | 108550210 | 9/2018 |
| CN | 112395911 | 2/2021 |
| CN | 117436887 | 1/2024 |
| KR | 2016138805 | 12/2016 |

* cited by examiner

*Primary Examiner* — Boris D Grijalva Lobos

(74) *Attorney, Agent, or Firm* — Alexander A. Knapp; Kowert, Hood, Munyon, Rankin & Goetzel, P.C.

(57) ABSTRACT

Methods for performing user authentication based on a similarity scoring technique for devices, such as head-mounted display devices, are disclosed. An image may be captured of an eye and may then be transformed into an iris feature representation. A similarity scoring technique may be determined based on discrimination factors of the iris feature representation and/or discrimination factors of one or more reference iris feature representations associated with a user identifier (ID). The similarity scoring technique may produce a similarity score based on applying a selected or modified scoring algorithm to the iris feature representation and the one or more reference iris feature representations. The similarity score may be compared to a threshold to provide an indication of whether the respective representations constitute a match. An authentication operation based on the user ID and the indication may be performed.

20 Claims, 10 Drawing Sheets

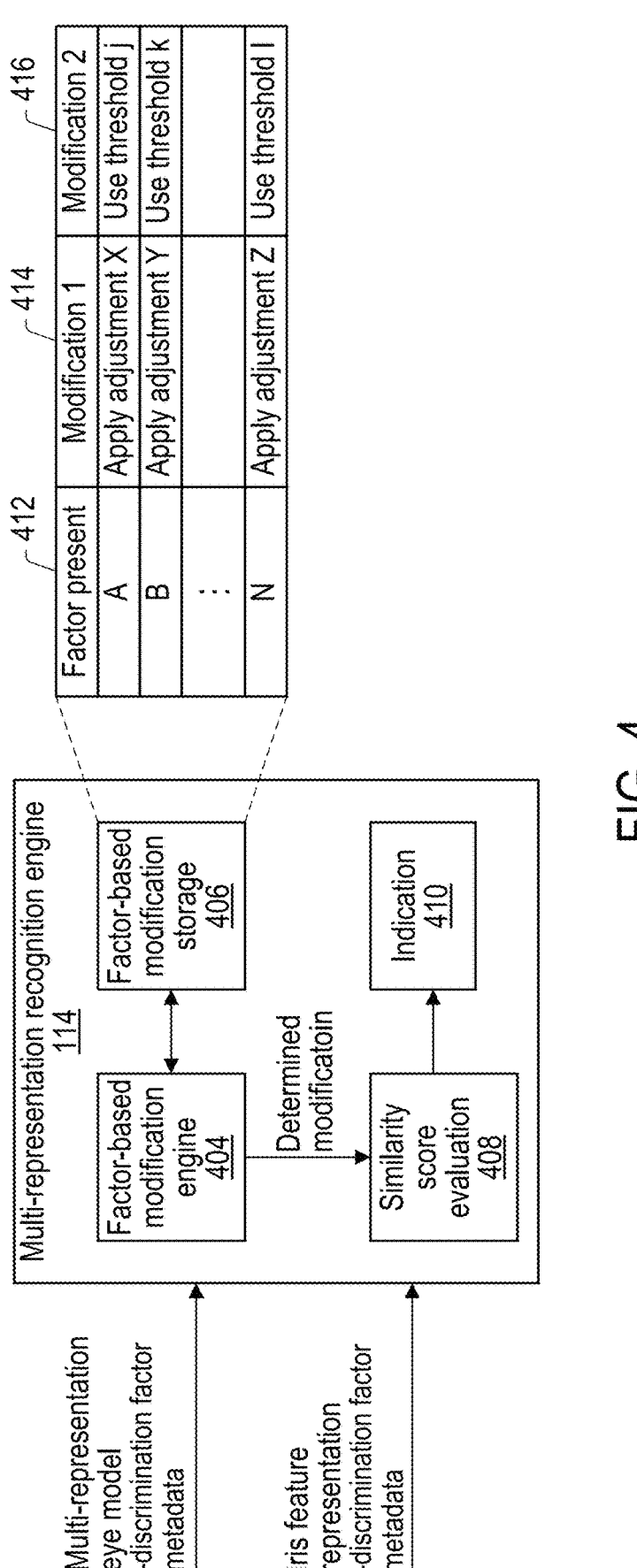

| Factor present | Modification 1 | Modification 2 |
|---|---|---|
| A | Apply adjustment X | Use threshold j |
| B | Apply adjustment Y | Use threshold k |
| ... | | |
| N | Apply adjustment Z | Use threshold l |

412

414

416

Multi-representation recognition engine 114

Factor-based modification engine 404

Factor-based modification storage 406

Similarity score evaluation 408

Indication 410

Determined modification

Multi-representation eye model -discrimination factor metadata

Iris feature representation -discrimination factor metadata

FIG. 4

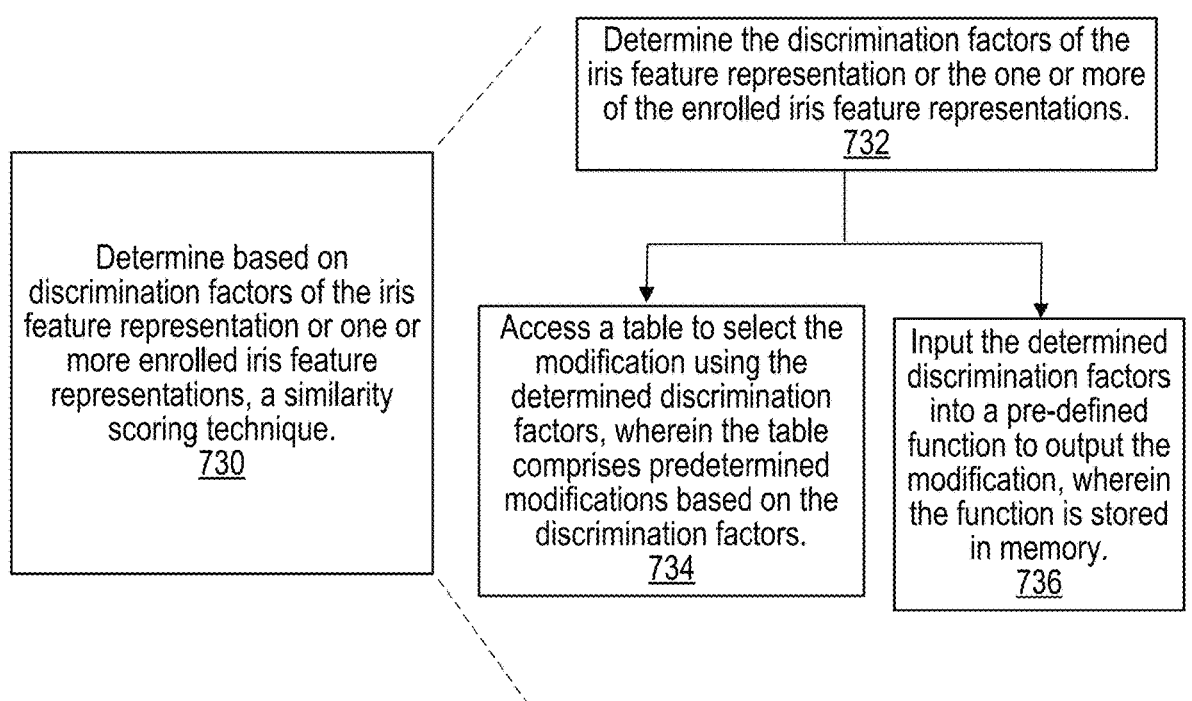

Determine based on discrimination factors of the iris feature representation or one or more enrolled iris feature representations, a similarity scoring technique.
730

Determine the discrimination factors of the iris feature representation or the one or more of the enrolled iris feature representations.
732

Access a table to select the modification using the determined discrimination factors, wherein the table comprises predetermined modifications based on the discrimination factors.
734

Input the determined discrimination factors into a pre-defined function to output the modification, wherein the function is stored in memory.
736

FIG. 8

BIOMETRIC EYE AUTHENTICATION USING ADAPTIVE DECISION THRESHOLDS AND/OR NORMALIZING DISTANCES

PRIORITY CLAIM

This application claims benefit of priority to U.S. Provisional Application Ser. No. 63/506,001, entitled "Biometric Eye Authentication Using Adaptive Decision Thresholds and/or Normalizing Distances," filed Jun. 2, 2023, and which is incorporated herein by reference in its entirety.

BACKGROUND

Description of the Related Art

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like. Such, XR systems may include cameras capable of capturing images of a user's eye. Other types of devices, such as mobile communication devices may also include cameras capable of capturing images of a user's eye.

Biometric recognition of an iris may, for example, be used in user authentication processes, for example in XR systems. In a conventional biometric recognition operation for an iris, an image of an eye is captured by a camera, at least a portion of the image of the eye is transformed to generate an iris feature representation, and a similarity scoring operation is performed on the iris feature representation and a previously generated iris feature representation to generate a similarity score. Portions of the iris feature representation correspond to regions or features of the eye captured in the image. In the similarity scoring operation, portions of the iris feature representation are compared to corresponding portions of a previously generated iris feature representation; each compared portion contributes to the overall similarity score for the two iris feature representations. Conventionally, portions of the iris feature representation corresponding to regions or features of the eye that are below a threshold of reliability for one or more reasons are simply excluded in the similarity scoring operation, and thus do not contribute to the overall similarity score.

SUMMARY

Various embodiments of methods and apparatus for multi-representation eye authentication using an adaptive decision threshold or normalized distances, for example for head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of a user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses. Additionally, such devices may include cameras with a viewing angle that includes a view of the wearer's eyes. Such cameras may be configured to capture eye images, such as of an iris of a wearer of the device.

In some systems, a user authentication process may be performed based on a captured eye image. During the user authentication process, a feature representation of the eye of the user that is trying to be authenticated may be compared to a feature representation of an identified eye that is associated with a given identity and for which a multi-representation eye model has been generated. The multi-representation eye model may be based on reference iris feature representations extracted from images of the identified eye, such as in an enrollment process. In some embodiments, a multi-representation eye model may comprise multiple iris feature representations extracted from an image of an eye, as well as other data, such as metadata about other factors observable when the iris feature representations were generated, such as image quality, lighting conditions, percentage of iris viewable, etc.

In such systems, to build the multi-representation eye model, images of an eye known as the identified eye may be captured at a different time under the same or different sets of conditions. The identified eye may be identified using a user identifier (ID). A set of conditions may include one or more of: lighting affecting the identified eye, pose of the identified eye, accommodation distance of the identified eye, obstructions (such as an eye lash) affecting a viewable portion of the identified eye, etc. The images may then be transformed into iris feature representations for the identified eye. An iris feature representation may include features from the image that represent different 3D topography, structures, or textures of an eye and is made to be inputted into the multi-representation eye model. The multi-representation eye model for the identified eye may then be generated or updated based on the iris feature representations. To perform the user authentication process, an image may be captured of an eye by a camera. The image may then be transformed into an iris feature representation and further be used to populate a multi-representation eye model. A modification and/or selection of a scoring algorithm may also be determined based on discrimination factors of the iris feature representation (or multi-representation model) and/or discrimination factors of one or more reference iris feature representations (or reference multi-representation models) associated with a user identifier (ID). A modification to a threshold based on the discrimination factors may also be used to determine a match. For example, different sets of conditions present either for the reference iris feature representation or the current iris feature representation may cause some iris feature information to be weighted less heavily or disregarded in a multi-representation eye model. This may lead to not having a matching portion in the reference iris feature representation (or the reference multi-representation eye model) or the current iris feature representation (or the current multi-representation eye model). The modification to the scoring algorithm may include adjusting (or selecting) a scoring algorithm that is modified to account for the reduced information available for comparison. Additionally, or alternatively, a modification may include adjusting a threshold used to determine a match relative to a distance (corresponding to differences) between the reference iris feature representation (or reference multi-representation model) and the current iris feature representation (or current multi-representation model). For example, discrimination factors may include factors that measure quality of the iris feature representation and/or the one or more reference iris feature representations.

The similarity scoring technique may be applied to evaluate whether the current eye can be authenticated. For example, a similarity score may be produced based on applying a scoring algorithm (which may be selected or otherwise modified to account for the discrimination factors) to the iris feature representation and the one or more reference iris feature representations. The similarity score may then be compared to a threshold (which also, or alternatively, may be selected or otherwise modified to account for the discrimination factors) to provide an indication of whether the iris feature representation (or reference multi-representation model) and the one or more reference iris feature representations (or reference multi-representation models) constitute a match. In some embodiments, the modification may include a modification of the scoring algorithm used for the similarity score, an adjustment of the threshold, and/or a combination of the two. An authentication operation based on the user ID and the indication of whether the iris feature representation and the one or more reference iris feature representations constitute a match may be performed. In some embodiments, the authentication operation may grant access to features of the device and/or may grant permission to perform a function using the device, such as authorizing a payment, as an example.

BRIEF DESCRIPTION OF THE DRAWINGS

FIG. 4 is a block diagram illustrating a multi-representation recognition engine, wherein the multi-representation recognition engine comprises a factor modification engine, a factor-based modification storage, and a similarity score evaluation engine, according to some embodiments.

FIG. 8 is a flow diagram illustrating a determining a modification or selection to a similarity scoring technique based on discrimination factors for an iris feature representation (e.g., multi-representation model) and/or reference iris feature representations (e.g., reference multi-representation models), according to some embodiments.

Figure 1:
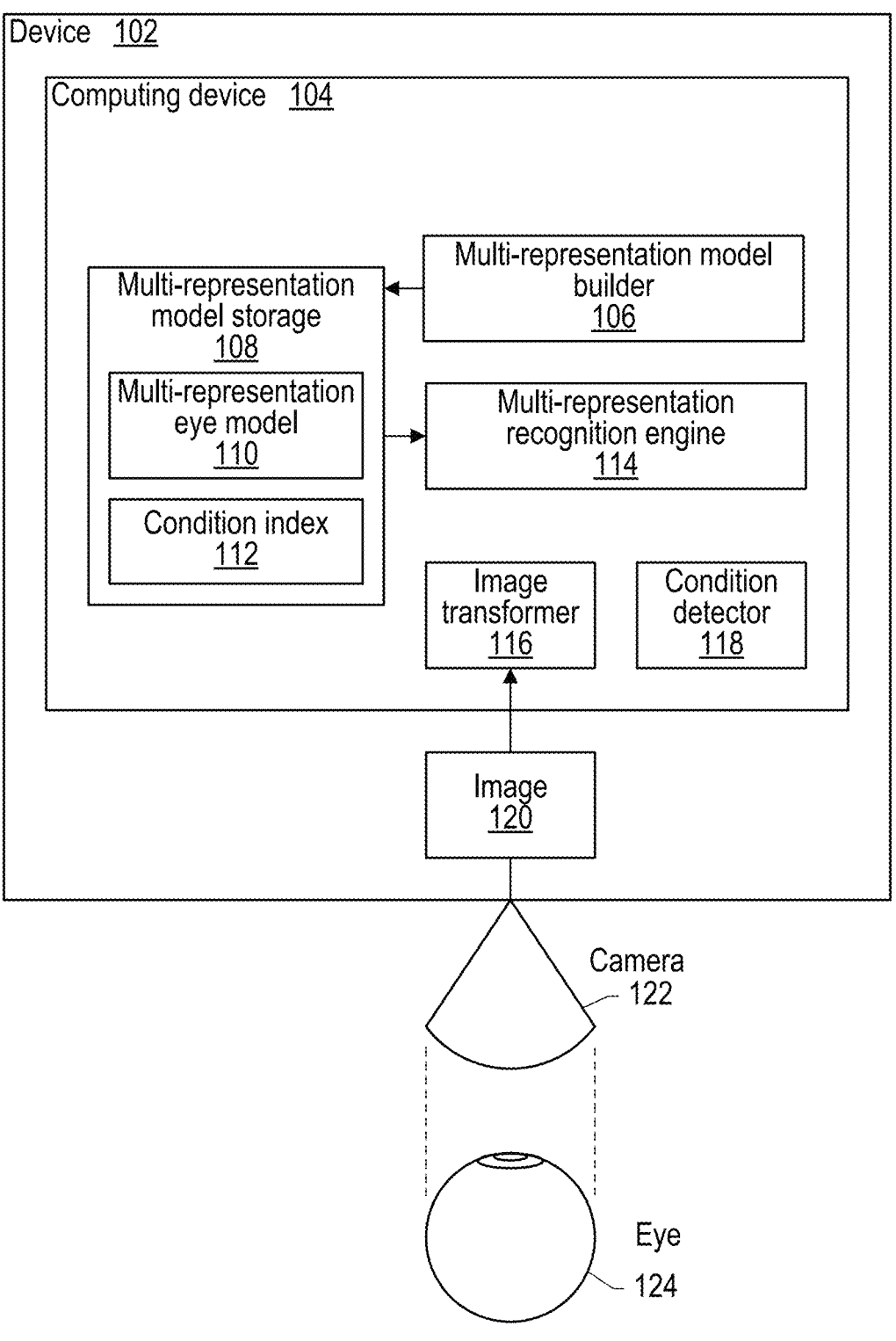
FIG. 1 is a block diagram illustrating a device, wherein a multi-representation user authentication process is performed by using a multi-representation eye model, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

It will also be understood that, although the terms 1, 2, N, etc. may be used herein to describe various elements, these elements should not be limited by these terms. These terms are only used to distinguish one element from another. For example, a component with the term 1 could be termed a second component, and, similarly, a component with the term 2 could be termed a first component, without departing from the scope of the present invention. The first components and the second component are both components, but they are not the same components. Also, the term N indicates that an Nth amount of the elements may or may not exist depending on the embodiments.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for multi-representation user authentication using a determined similarity scoring technique for a device, are described.

In at least some systems, a device, such as a head-mounted display (HMD) device, may include user login processes. In some cases, the user login processes may include a user authentication process using a similarity scoring technique to ensure an identify of an individual attempting to login matches a correct user. Or, once logged-in a user authentication process using a similarity scoring technique may be used to authenticate a user attempting to access or authorize a given feature transaction matches an identify of a known user with sufficient access rights to access the given feature or authorize the given feature transaction. In an example, one or more cameras may capture an image of a user's eye. The image may be transformed into an iris feature representation in order to determine whether the iris feature representation and one or more reference iris feature representations associated with a user ID constitute a match. The one or more reference iris feature representations may be obtained via an enrollment process, and/or acquired or updated at other times when the user is known. The one or more reference iris feature representations may be included in a multi-representation eye model generated during an enrollment process of a user associated with the user ID.

A modification to the scoring algorithm and/or threshold may be determined based on discrimination factors of the iris feature representation or the discrimination factors of the one or more reference iris feature representations. Discrimination factors may include, but are not limited to, factors that measure quality of the iris feature representation and/or the one or more reference iris feature representations. The similarity scoring technique may then be applied. To apply the similarity scoring technique, a similarity score may be produced based on applying a scoring algorithm to the iris feature representation and one or more reference iris feature representations. In some embodiments, the modification may include a modification of the scoring algorithm used for the similarity score, an adjustment of the threshold, or a combination of the two.

The similarity score may then be compared to a threshold, and this comparison may be used to the provide an indication of whether the iris feature representation and the one or more reference iris feature representations constitute a match. An authentication operation may be performed based on the user ID and the indication of whether the iris feature representation and the one or more reference iris feature representations constitute a match. In some embodiments, the authentication operation may grant access to features of the device and/or may grant permission to perform a function using the device, such as authorizing a transaction. If the respective iris feature representations do not constitute a match, then the user may be unable to log in to the account or access a feature on the device using this method or may have to re-attempt the user authentication process using this method.

In such systems, to build the multi-representation eye model, a first image of an eye known as the identified eye may be captured at a first time under a first set of conditions.

A set of conditions may include one or more of lighting affecting the identified eye, pose of the identified eye, accommodation distance of the identified eye, obstructions (such as an eye lash) blocking a view of a portion of the identified eye, etc. The first image may then be transformed into a first feature representation for the identified eye. A feature representation includes features from the image that represent different 3D topography, structures, or textures of an eye and is made to be inputted into the multi-representation eye model. Metadata of the feature representation including discrimination factors of the feature representation may be recorded. A second image of the identified eye may then be captured at a second time after the first time under a second set of conditions different than the first set of conditions. The second image may be transformed into a second feature representation for the identified eye.

The multi-representation eye model for the identified eye may be generated or updated based on reference iris feature representations. Building the multi-representation eye model may be performed during an enrollment process initiated for eye authentication for a user. The multi-representation eye model may be generated at a time during use of the device. The multi-representation eye model may be updated with other iris feature representations. Iris feature representations of different sets of conditions may be added until the multi-representation eye model reaches a maximum amount of iris feature representations. New iris feature representations may also replace existing iris feature representations in the multi-representation eye model based on a quality indicator or an age of the existing iris feature representations. In some systems, the multi-representation eye model may be updated during use of the device by the user of the identified eye. The multi-representation eye model may be updated during times when it is unobtrusive for the user.

FIG. 1 is a block diagram illustrating a device, wherein a multi-representation user authentication process is performed by using a multi-representation eye model, according to some embodiments.

In some embodiments, a device performing a user authentication process by using a multi-representation eye model, such as a multi-representation eye model 110, may resemble embodiments as shown in FIG. 1. In some embodiments, a multi-representation eye model 110 may include reference iris feature representations for different sets of conditions. A multi-representation eye model 110 may include a fused model in some embodiments, wherein the reference iris feature representations are combined into one model.

In some embodiments, the device 102 may comprise a computing device 104. In such embodiments, a camera 122 may capture an image 120 of an eye 124. A condition detector 118 may receive the set of conditions of the eye. Conditions may include but are not limited to lighting affecting the eye, pose of the eye, accommodation distance for the eye, or indication of force applied to the eye. The image transformer 116 may then receive the image 120.

The image transformer 116 may transform the image 120 into an iris feature representation that may be sent to the multi-representation recognition engine 114 or the multi-representation model builder 106. During a process of generating or updating the multi-representation eye model 110, the iris feature representation of the image 120 may be sent to the multi-representation model builder 106. During a process of user authentication, the iris feature representation of the image 120 may be sent to the multi-representation recognition engine 114. Iris feature representations may include features that represent different 3D topography, structures, or textures of the eye captured under a set of conditions. The multi-representation model builder 106 may build a multi-representation eye model and store the multi-representation eye model into a multi-representation model storage 108. The multi-representation recognition engine 114 may then access the multi-representation eye model 110 during a user authentication process to determine whether the iris feature representation and one or more of the reference iris feature representations from the multi-representation eye model 110 constitutes a match.

In some embodiments, the multi-representation recognition engine 114, may access a condition index 112 to determine corresponding one or more iris feature representations of the multi-representation eye model based on the set of conditions from the iris feature representation. For example, if two reference iris feature representations of the multi-representations eye model have the same lighting affecting the eye and accommodation of the eye as the current iris feature representation, then these two reference iris feature representations may be accessed and compared to the current iris feature representation using the condition index 112. In some embodiments, discriminations factors, used in determining whether the iris feature representation and one or more of the reference iris feature representations from the multi-representation eye model 110 constitutes a match, may be affected by the conditions of the eye. Metadata of the discrimination factors may also be stored in the multi-representation model storage 108.

Figure 2:
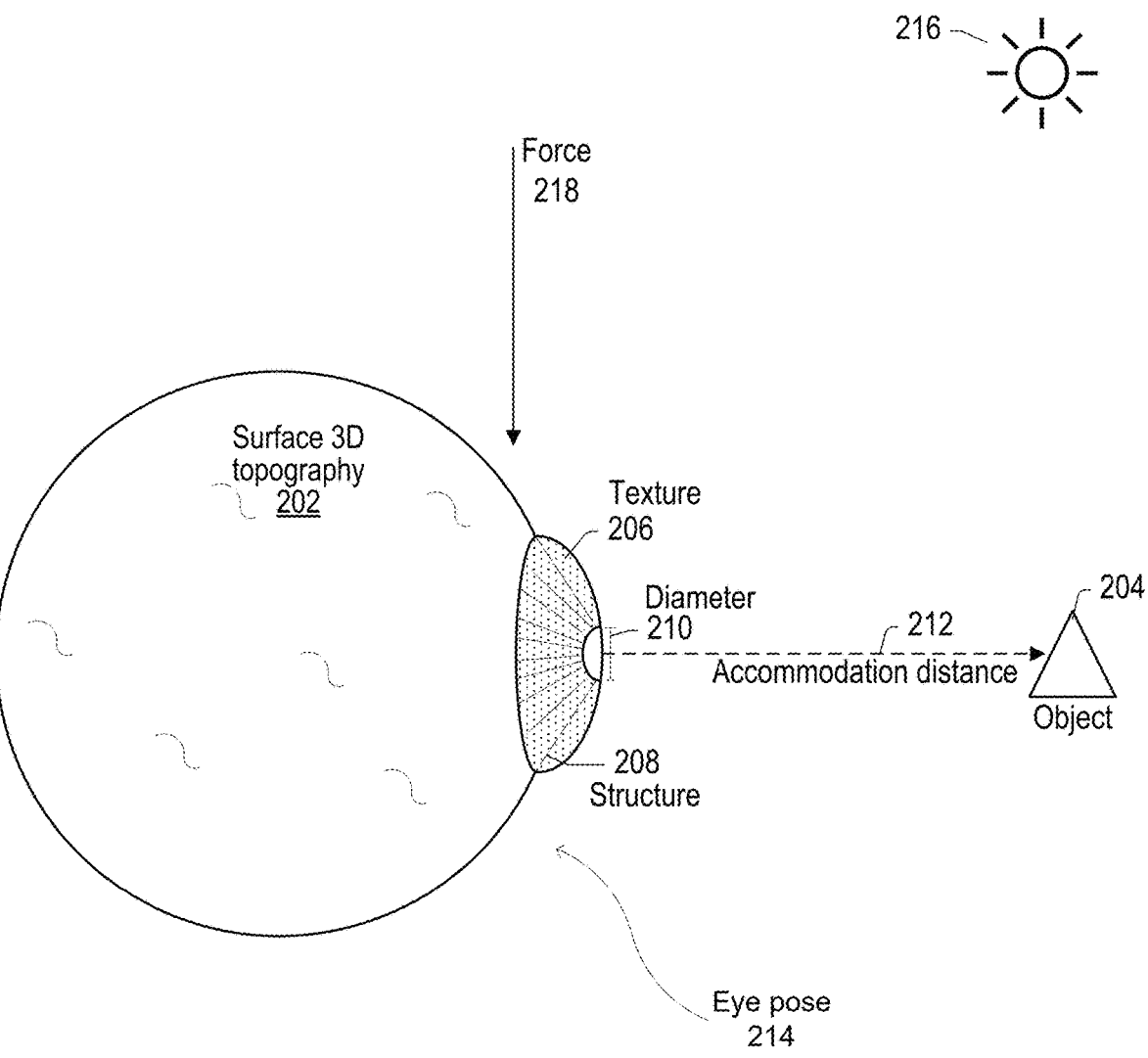
FIG. 2 graphically illustrates an eye comprising features under different conditions, according to some embodiments.

FIG. 2 graphically illustrates an eye comprising features under different conditions, according to some embodiments.

Some embodiments, such as shown in FIG. 1, may include further features such as shown in FIG. 2. In some embodiments, the eye 124 being captured by the camera 122 may include surface 3D topography 202, structures 208, or textures 206 and experience different sets of conditions depending on the situation. Depending on the conditions experienced by the eye 124, the features of an iris feature representation that represent the surface 3D topography 202, the structures 208, the textures 206, or the diameter 210 of the pupil may be different.

Examples of different conditions include but are not limited to, force 218, lighting 216, accommodation distance 212, and eye pose 214. Accommodation distance represents the distance away an object 204 is that eye is focusing on. The eye pose 214 may represent the position of the eye and may change depending on the direction the eye is looking. The force 218 may represent any force occurring to the eye. Features, as described above, of a current iris feature representation may be compared to features of the multi-representation model 110 to determine whether a current eye of the current iris feature representation is a match for an identified eye of the multi-representation model.

Figure 3:
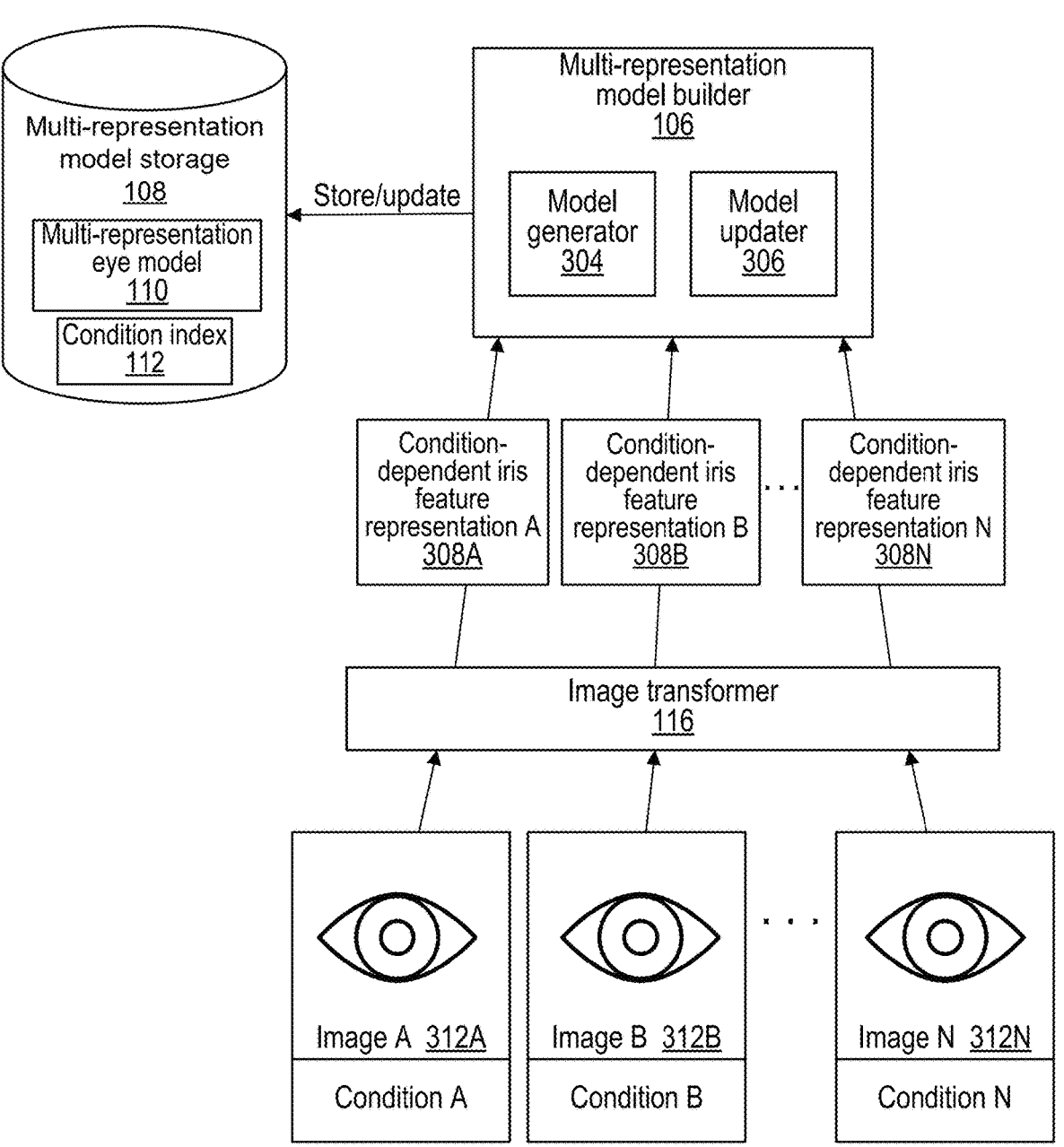
FIG. 3 is a block diagram illustrating a multi-representation model builder, wherein a multi-representation eye model is generated or updated based on condition-dependent iris feature representations, according to some embodiments.

FIG. 3 is a block diagram illustrating a multi-representation model builder, wherein a multi-representation eye model is generated or updated based on condition-dependent iris feature representations, according to some embodiments.

Some embodiments, such as shown in FIGS. 1-2, may include further features such as shown in FIG. 3. In such embodiments, images A, B, and N (312A, 312B, 312N) including conditions A, B, N may be provided to the image transformer 116. The image transformer 116 may then output and send condition-dependent iris feature representations A, B, and N (308A, 308B, 308N) to the multi-representation model builder 106.

In some embodiments, a model generator 304 may generate the multi-representation eye model 110 based on the condition-dependent reference iris feature representations A, B, and N (308A, 308B, 308N) and may store the multi-representation eye model 110 into the multi-representation model storage 108. In some embodiments, a model updater 306 may update the multi-representation eye model 110 into the multi-representation model storage 108 based on the condition-dependent reference iris feature representations A, B, and N (308A, 308B, 308N). The condition index 112 that contains data indicating which sets of conditions apply to each of the condition-dependent iris feature representations, may also be stored into the multi-representation model storage 108. Discrimination factors that include measures of quality of iris feature representations may also be stored into the multi-representation model storage 108.

FIG. 4 is a block diagram illustrating a multi-representation recognition engine, wherein the multi-representation recognition engine comprises a factor modification engine, a factor-based modification storage, and a similarity score evaluation, according to some embodiments.

Some embodiments, such as shown in FIGS. 1-3, may include further features such as shown in FIG. 4. The multi-representation recognition engine 114 may receive a multi-representation eye model and an iris feature representation. The multi-representation eye model may include one or more reference iris feature representations and discrimination factor meta data for the one or more reference iris feature representations. The iris feature representation may also include discrimination factor meta data for the iris feature representation. The multi-representation recognition engine 114 may include a factor-based modification engine 404, a factor-based modification storage 406, and a similarity score evaluation 408. In some embodiments, during an authentication process the similarity scoring technique may be applied using a selected scoring algorithm relative to a baseline scoring algorithm, to compensate for the discrimination factors of the iris feature representation or the discrimination factors of the one or more reference iris feature representations of the multi-representation eye model. In some embodiments, during an authentication process, the factor-based modification engine 404 may determine a modification to the baseline scoring algorithm to compensate for the discrimination factors received by the multi-representation eye model and the iris feature representation.

The factor-based modification engine 404 may access a factor-based modification storage 406 to determine the modification needed. In some embodiments, as shown in FIG. 4, a table may be accessed to determine the modification.

A portion of the table may list possible discrimination factors that may be present in the representations 412. For example, a discrimination factor may include a common valid element count. In some embodiments the iris feature representation and the one or more reference iris feature representations may be feature vectors that each comprise a plurality of elements at respective vector positions. Respective validities of the elements of the feature vectors at respective vector positions for the iris feature representations and the one or more reference iris feature representations may be determined based on one or more quality metrics for the respective iris image portions corresponding to the iris feature representation and the one or more reference iris feature representations. The common valid element count may be determined based on the determined respective validities of the elements of the iris feature representation and the one or more reference iris feature representations. The common valid element count may indicate a number of vector positions having valid elements for both the iris feature representation and the one or more reference iris feature representations.

Based on the factor present 412, one or more modifications or selections may be used or a combination thereof. The one or more modifications or selections may be used such that a probability that the indication of whether the iris feature representation and the one or more reference iris feature representations constitutes a match produce a false indication of a match may be normalized across users or image capture conditions exhibiting the discrimination factors. One of the modifications 414 may be applying a modified scoring algorithm for the similarity scoring technique. The second modification 414 may be modifying or using a different threshold for comparison of the similarity score. For example, if the discrimination factor is that the common valid element count is lower than the average common valid element count, then the threshold that similarity score is compared to may be increased to prevent an increase in false acceptance rate. A scoring algorithm may also be selected from existing scoring algorithms that are pre-adjusted relative to the baseline scoring algorithm.

The determined modification may then be provided to the similarity score evaluation 408. The similarity score may be produced and compared to the threshold by the similarity score evaluation. The similarity score evaluation 408 may then provide an indication 410 of whether the iris feature representation and the one or more reference iris feature representations constitute a match.

In some embodiments, an authentication operation may then be performed based on the user ID and the indication of whether the iris feature representation and the one or more reference iris feature representations constitute a match.

Figure 5A:
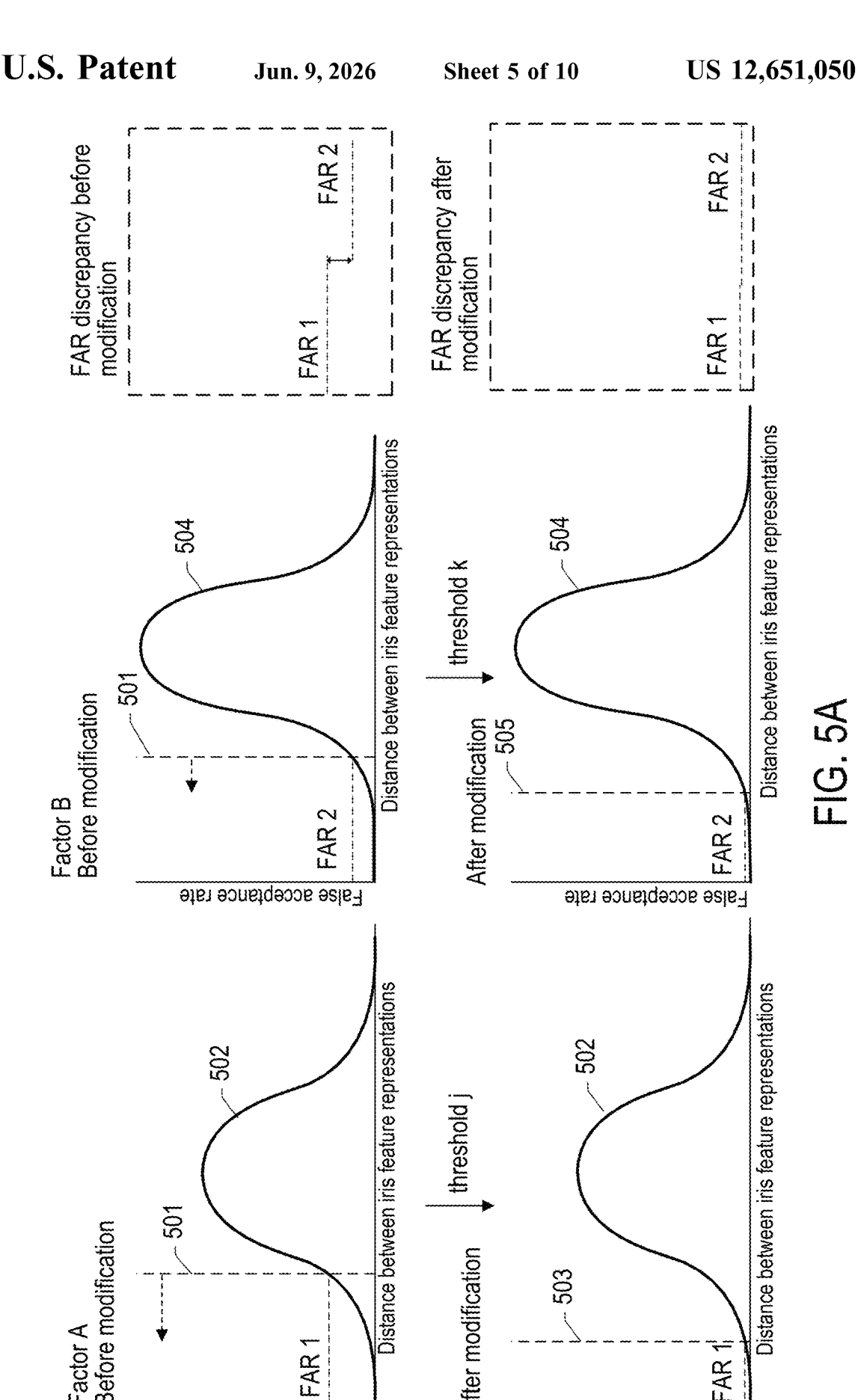
FIG. 5A-B graphically illustrates distance distributions and associated false acceptance rates between an iris feature representation (e.g., multi-representation model) and one or more reference iris feature representations (e.g., reference multi-representation models) based on discrimination factors before and after modification, according to some embodiments.
Figure 5B:
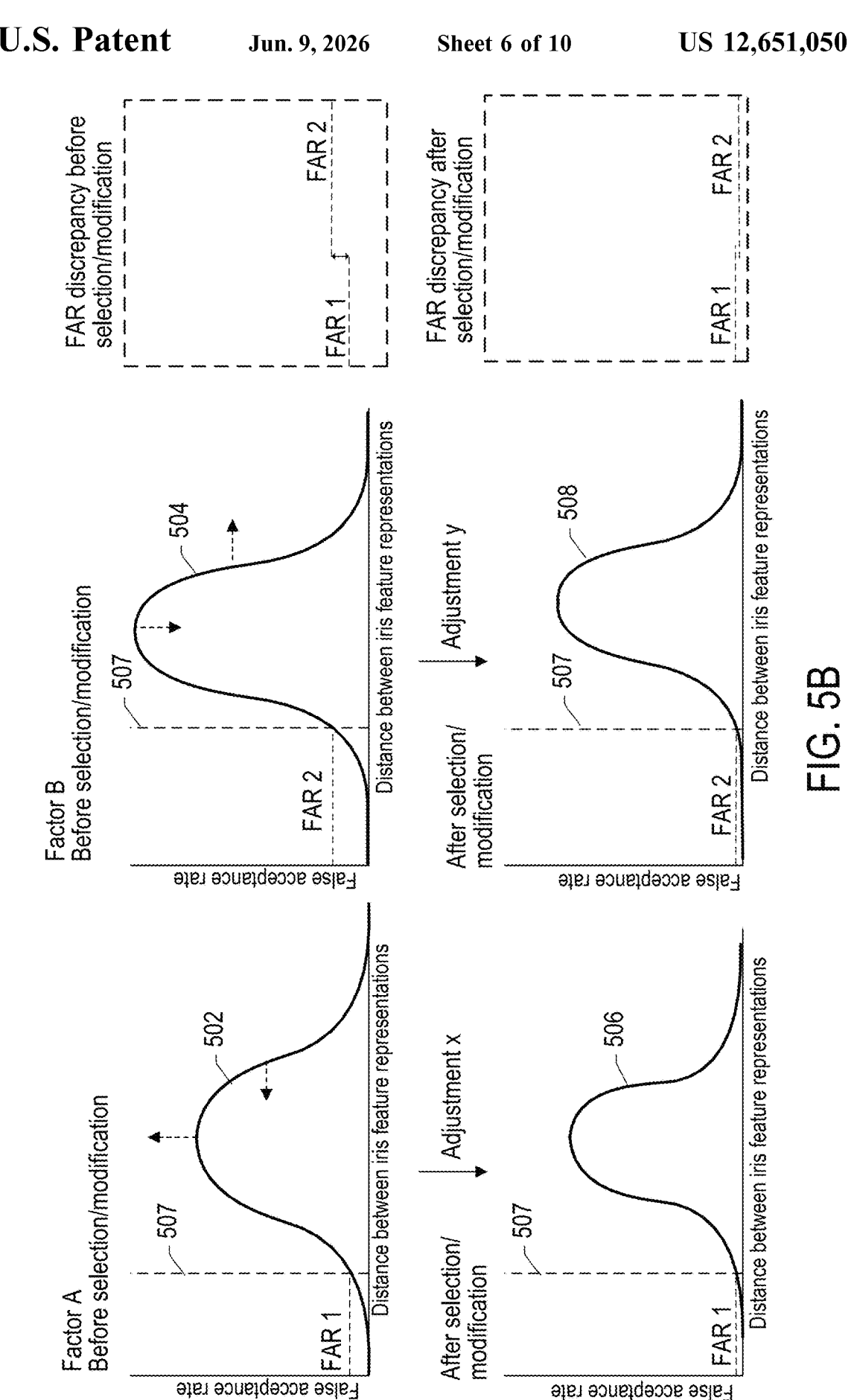

FIGS. 5A-B graphically illustrate distance distributions and associated false acceptance rates between an iris feature representation and one or more reference iris feature representations based on discrimination factors before and after modification, according to some embodiments.

Some embodiments, such as shown in FIGS. 1-4, may include further features such as shown in FIGS. 5A-B. In FIGS. 5A-B, graphic distributions before and after modification for different discrimination factors are shown. The graphic distributions illustrate a distance distribution and associated false acceptance rates (FAR) wherein the x-axis represents distances between iris feature representations in the vector space. The more similar the iris feature representations are to each other, the smaller the distance would be. In FIG. 5A, two distributions, 502 and 504, are shown before modification for two different discrimination factors. The distribution to the left of a threshold 501 on the two distributions may indicate the current allowed false acceptance rate for each distribution, FAR1 and FAR2. The FAR discrepancy between discrimination factors A and B is shown to the right and illustrates the presence of a discrepancy in false acceptances between authorization attempts performed when discrimination factor A is present and other authorization attempts performed when discrimination factor B is present. The dotted arrow on the before modification distributions provides an example of a modification to be performed. After modification threshold j and threshold k, the graphic illustration of the distributions for factor A and factor B is shown below (e.g., below the before modification distributions). FIG. 5A shows only a modification of the threshold 501 to become thresholds 503 and 505 respectively. The FAR discrepancy after modification is shown in the bottom right, where the modifications to thresholds j and k reduce or eliminate the discrepancy.

Similarly, in FIG. 5B, graphic depictions of the distance distribution associated with false acceptance rates based on two discrimination factors before and after selection or modification are shown. The distributions for factor A 502 and factor B 504 and the threshold 507 for both distributions are shown before the modification. Instead of modifying the thresholds, adjustments to the baseline scoring algorithm, adjustment x and y, may be performed. The adjustments may affect the distributions changing from distribution 502 to distribution 506 and distribution 504 to distribution 508. In some embodiments, the adjustments x and y may be shown by selecting an already adjusted scoring algorithm from existing scoring algorithms. The FAR discrepancy before and after selection/modification is also shown in the bottom right, where the modifications x and y to the scoring algorithm reduce or eliminate the discrepancy.

Figure 6A:
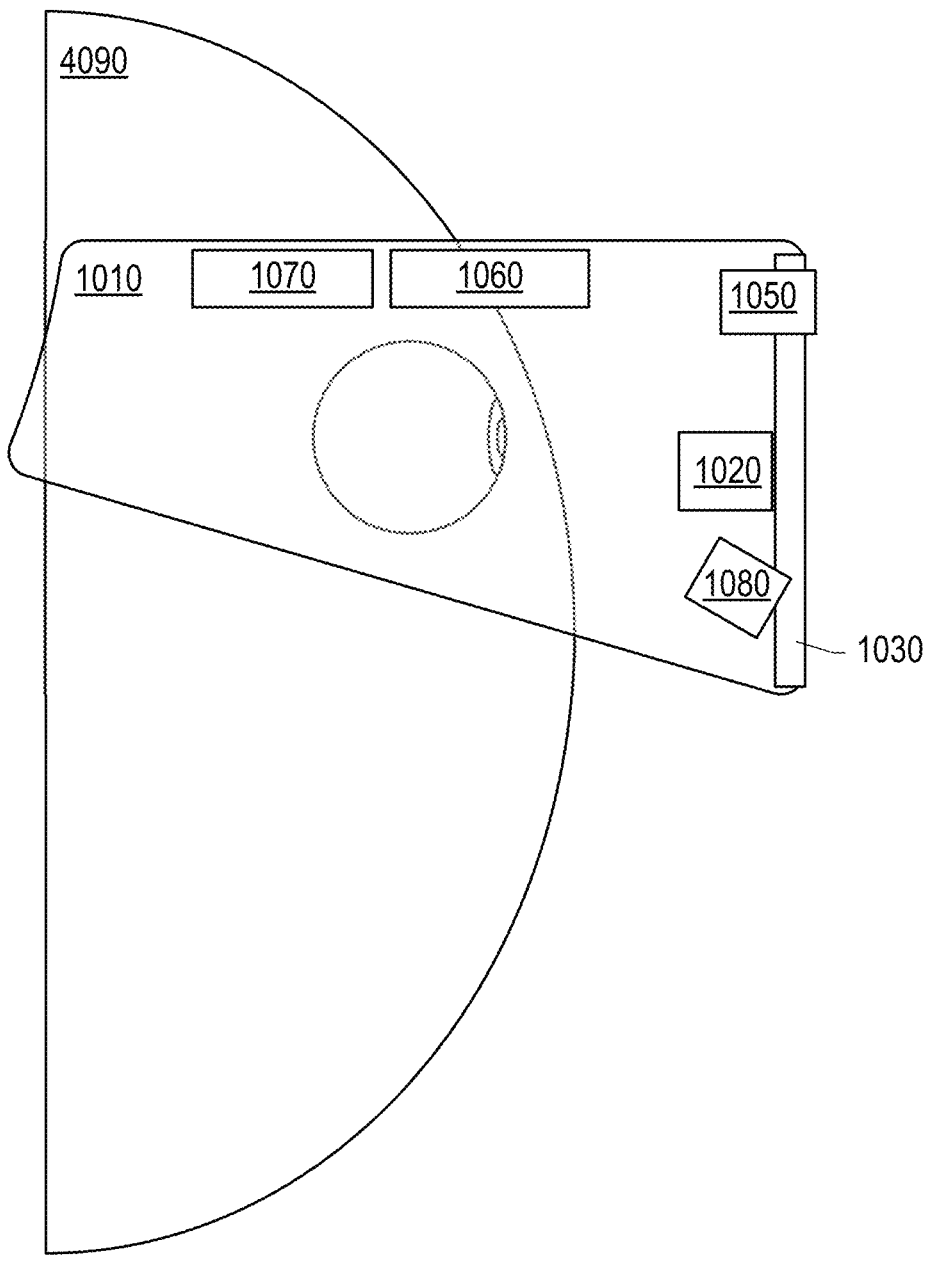
FIGS. 6A-C is a block diagram illustrating example devices in which the methods of FIGS. 1 through 8 may be implemented, according to some embodiments.
Figure 6B:
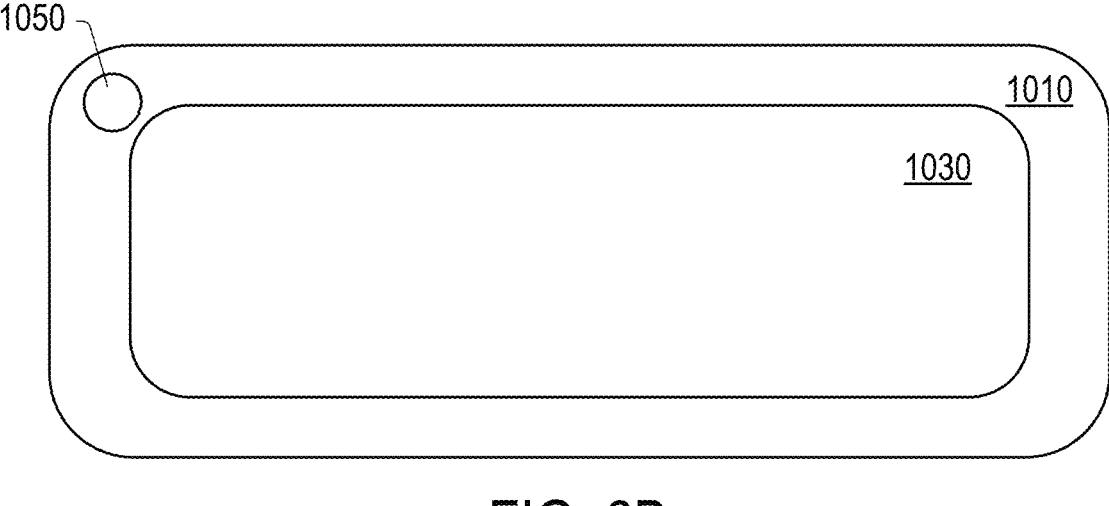
Figure 6C:
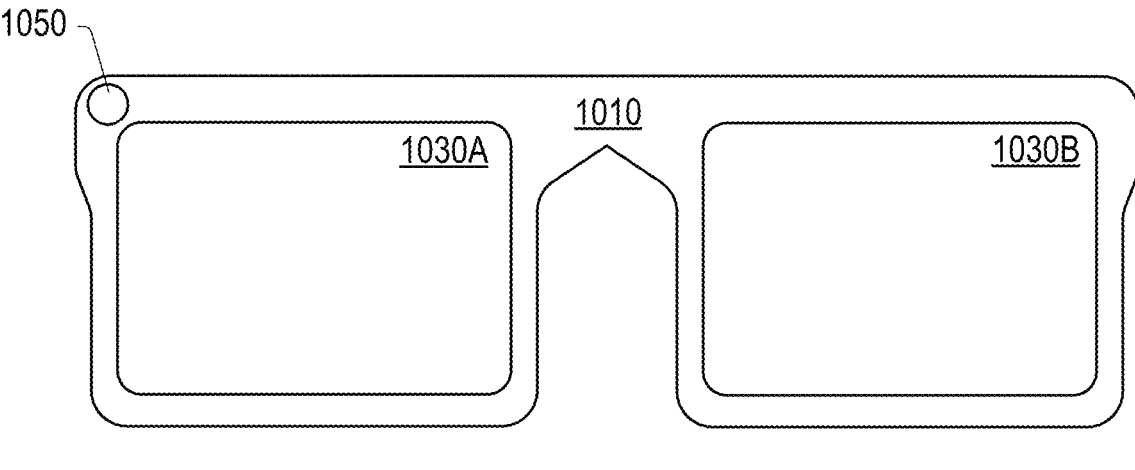

FIGS. 6A-C is a block diagram illustrating example devices in which the methods of FIGS. 1 through 5B and 7 through 8 may be implemented, according to some embodiments.

Note that the HMDs as illustrated in FIGS. 6A through 6C are given by way of example and are not intended to be limiting. Also, as mentioned above, techniques described herein could also be implemented on other types of devices, such as mobile phones, laptops, vehicles, etc.

In various embodiments, the shape, size, and other features of an HMD may differ, and the locations, numbers, types, and other features of the components of an HMD and of the eye imaging system. FIG. 6A shows a side view of an example HMD, and FIGS. 6B and 6C show alternative front views of example HMDs, with FIG. 6B showing device that has one lens 1030 that covers both eyes and FIG. 6C showing a device that has right 1030A and left 1030B lenses.

The HMD may include lens(es) 1030, mounted in a wearable housing or frame 1010. The HMD may be worn on a user's head (the "wearer") so that the lens(es) is disposed in front of the wearer's eyes. In some embodiments, an HMD may implement any of various types of display technologies or display systems. For example, the HMD may include a display system that directs light that forms images (virtual content) through one or more layers of waveguides in the lens(es) 1020; output couplers of the waveguides (e.g., relief gratings or volume holography) may output the light towards the wearer to form images at or near the wearer's eyes.

As another example, the HMD may include a direct retinal projector system that directs light towards reflective components of the lens(es); the reflective lens(es) is configured to redirect the light to form images at the wearer's eyes. In some embodiments the display system may change what is displayed to at least partially affect the conditions and features of the eye for the purpose of generating or updating the multi-representation eye model. For example, the display may increase the brightness to change the conditions of the eye such as lighting that is affecting the eye. Another example, the display may change the distance an object appears on the display to affect the conditions of the eye such as the accommodation distance of the eye.

In some embodiments, HMD may also include one or more sensors that collect information about the wearer's environment (video, depth information, lighting information, etc.) and about the wearer (e.g., eye or gaze sensors). The sensors may include one or more of, but are not limited to one or more eye cameras 1020 (e.g., infrared (IR) cameras) that capture views of the user's eyes, one or more world-facing or PoV cameras 1050 (e.g., RGB video cameras) that can capture images or video of the real-world environment in a field of view in front of the user, and one or more ambient light sensors that capture lighting information for the environment. Cameras 1020 and 1050 may be integrated in or attached to the frame 1010. The HMD may also include one or more light sources 1080 such as LED or infrared point light sources that emit light (e.g., light in the IR portion of the spectrum) towards the user's eye or eyes.

A controller 1060 for the XR system may be implemented in the HMD, or alternatively may be implemented at least in part by an external device (e.g., a computing system or handheld device) that is communicatively coupled to the HMD via a wired or wireless interface. Controller 1060 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 1060 may render frames (each frame including a left and right image) that include virtual content based at least in part on inputs obtained from the sensors and from an eye authentication system and may provide the frames to the display system.

Memory 1070 for the XR system may be implemented in the HMD, or alternatively may be implemented at least in part by an external device (e.g., a computing system) that is communicatively coupled to the HMD via a wired or wireless interface. The memory 1070 may, for example, be used to record video or images captured by the one or more cameras 1050 integrated in or attached to frame 1010. Memory 1070 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc.

In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIG. 6A only shows light sources 1080 and cameras 1020 and 1050 for one eye, embodiments may include light sources 1080 and cameras 1020 and 1050 for each eye, and user authentication may be performed for both eyes. In addition, the light sources, 1080, camera 1020 and PoV camera 1050 may be located elsewhere than shown.

Embodiments of an HMD as illustrated in FIGS. 6A-6C may, for example, be used in augmented or mixed (AR) applications to provide augmented or mixed reality views to the wearer. The HMD may include one or more sensors, for example located on external surfaces of the HMD, that collect information about the wearer's external environment (video, depth information, lighting information, etc.); the sensors may provide the collected information to controller 1060 of the XR system.

The sensors may include one or more visible light cameras 1050 (e.g., RGB video cameras) that capture video of the wearer's environment that, in some embodiments, may be used to provide the wearer with a virtual view of their real environment. In some embodiments, video streams of the real environment captured by the visible light cameras 1050 may be processed by the controller 1060 of the HMD to render augmented or mixed reality frames that include virtual content overlaid on the view of the real environment, and the rendered frames may be provided to the display system.

Figure 7:
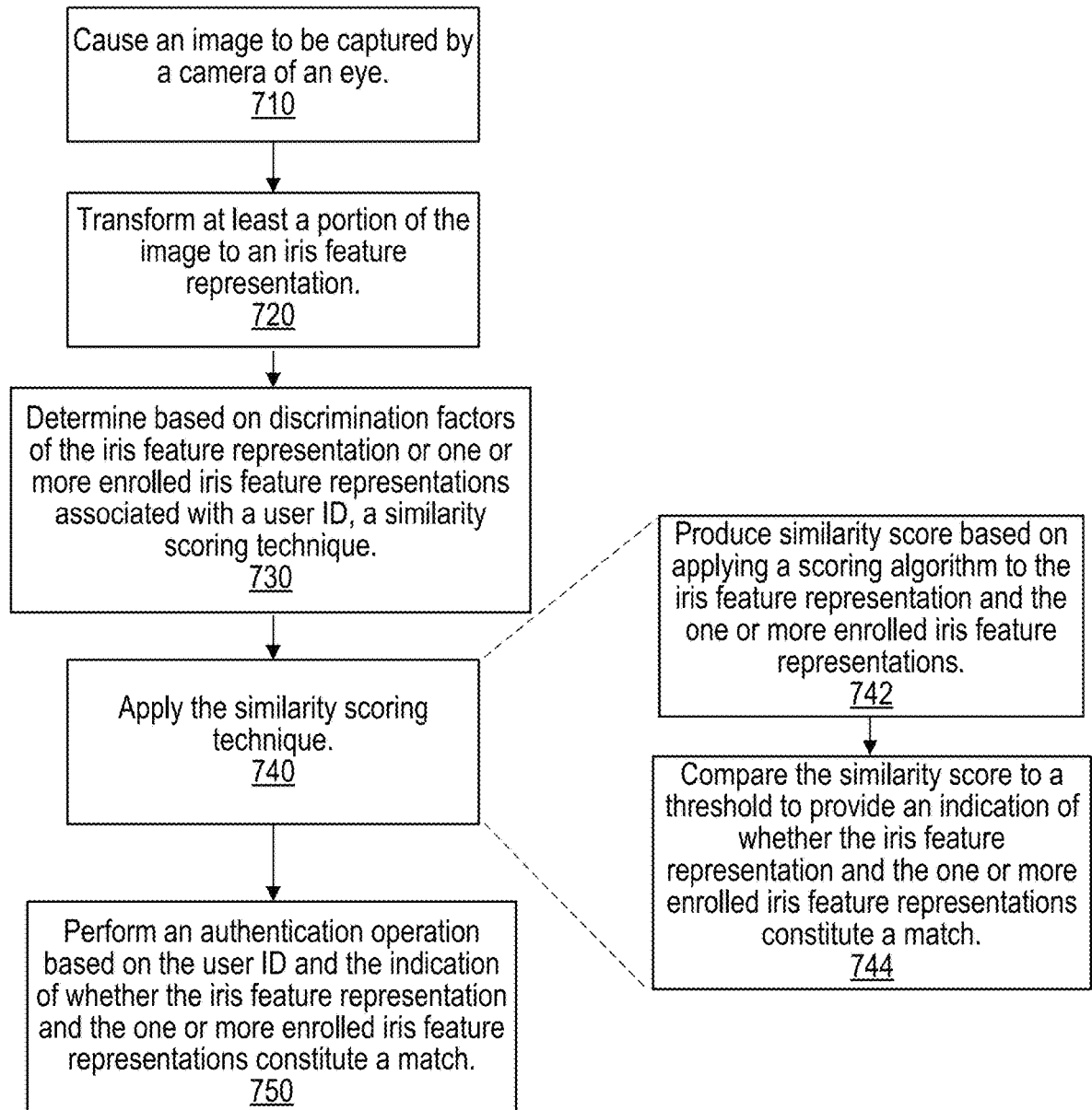
FIG. 7 is a flow diagram illustrating a process of performing a user authentication process using a similarity scoring technique based on discrimination factors for an iris feature representation (e.g., multi-representation model) and/or reference iris feature representations (e.g., reference multi-representation models), according to some embodiments.

FIG. 7 is a flow diagram illustrating a process of performing a user authentication process using a similarity scoring technique based on discrimination factors of an iris feature representation or reference iris feature representations, according to some embodiments.

In some embodiments, a process of performing a user authentication process may resemble a process such as that which is shown in FIG. 7. In block 710, an image may be captured by a camera of an eye. In block 720, at least a portion of the image may be transformed to an iris feature representation. In block 730, based on discrimination factors of the iris feature representations and/or one or more reference iris feature representations associated with a user ID, a modification to the similarity score may be determined to provide a similarity scoring technique. Block 730 may be further described in FIG. 8. In block 740, the similarity scoring technique may be applied. The application may be further explained in block 742 and 744. In block 742, a similarity score may be produced based on applying a scoring algorithm to the iris feature representation and the one or more reference iris feature representations. In block 744, the similarity score may then be compared to a threshold to provide an indication of whether the iris feature representation and the one or more reference iris feature representations constitute a match. In block 750, an authentication operation based on the user ID and the indication of whether the iris feature representation and the one or more reference iris feature representations constitute a match.

FIG. 8 is a flow diagram illustrating a determining a modification or selection to a similarity scoring technique based on discrimination factors of an iris feature representation or reference iris feature representations, according to some embodiments.

In some embodiments, a process of determining a modification to a threshold or baseline scoring algorithm or a selection of a scoring algorithm may resemble a process such as that which is shown in FIG. 8. As a further description of block 730, in block 732 discrimination factors of the iris feature representation and/or the one or more of the reference iris feature representations may be determined. For example, a common valid element count may be a discrimination factor determined. The process may continue to block 734 or block 736. In block 734, a table may be accessed to select the modification using the determined discrimination factors, wherein the table comprises predetermined modifications based on the discrimination factors. In block 736, the determined discrimination factors may be inputted into a pre-defined function to output the modification, wherein the function may be stored in memory.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing an HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
one or more processors; and
a memory storing:
    one or more reference iris feature representations; and
    program instructions that, when executed using the one or more processors, cause the one or more processors to perform an iris authentication process, wherein to perform the iris authentication process, the one or more processors:
        determine, based on discrimination factors of an iris feature representation or discrimination factors of the one or more reference iris feature representations, a similarity scoring technique; and
        apply the similarity scoring technique, wherein, to apply the similarity scoring technique, the one or more processors:
            produce a similarity score based on applying a scoring algorithm to the iris feature representation and the one or more reference iris feature representations; and
            compare the similarity score to a threshold to provide an indication of whether the iris feature representation and the one or more reference iris feature representations constitute a match; and
        perform an authentication operation based on the indication of whether the iris feature representation and the one or more reference iris feature representations constitute a match.

2. The device of claim 1, wherein the determined similarity scoring technique comprises a selected scoring algorithm or a modified scoring algorithm, selected or modified relative to a baseline scoring algorithm, to compensate for the discrimination factors of the iris feature representation or the discrimination factors of the one or more reference iris feature representations.

3. The device of claim 1, wherein the determined similarity scoring technique comprises a modification of the threshold to compensate for the discrimination factors of the iris feature representation or the discrimination factors of the one or more reference iris feature representations.

4. The device of claim 1, wherein the iris feature representation and the one or more reference iris feature representations are feature vectors that each comprise a plurality of elements at respective vector positions.

5. The device of claim 4, wherein the program instructions when executed using the one or more processors cause the one or more processors to:
determine, based on one or more quality metrics for respective iris image portions corresponding to the iris feature representation and the one or more reference iris feature representations, respective validities of the elements of the feature vectors at respective vector positions for the iris feature representation and the one or more reference iris feature representations,
wherein the discrimination factors include at least a common valid element count, determined based on the determined respective validities of the elements of the iris feature representation and the one or more reference iris feature representations, wherein the common valid element count indicates a number of the vector positions having valid elements for both the iris feature representation and the one or more reference iris feature representations.

6. The device of claim 1, wherein the similarity scoring technique is configured such that a probability that the indication of whether the iris feature representation and the one or more reference iris feature representations constitutes a match produces a false indication of a match is normalized across users or image capture conditions exhibiting the discrimination factors.

7. The device of claim 1, wherein to determine the similarity score technique, the program instructions, when executed using the one or more processors, cause the one or more processors to:

determine the discrimination factors of the iris feature representation or the one or more reference iris feature representations; and access a table to select a scoring algorithm or threshold to apply based on the determined discrimination factors, wherein the table comprises predetermined scoring algorithms or thresholds corresponding to different ones of the discrimination factors.

8. The device of claim 1, wherein to determine the similarity score technique, the program instructions, when executed using the one or more processors, cause the one or more processors to:

determine the discrimination factors of the iris feature representation or the one or more reference iris feature representations; and input the determined discrimination factors into a function to output a modification to a baseline scoring algorithm or a modification to a baseline threshold, wherein the function is stored in the memory.

9. The device of claim 1, wherein the authentication operation grants access to features of the device.

10. The device of claim 1, wherein the authentication operation grants permission to perform a function using the device.

11. A method, comprising:

determining, based on discrimination factors of:

an iris feature representation or one or more reference iris feature representations, a similarity scoring technique; and applying the similarity scoring technique, wherein applying the similarity scoring technique comprises:

producing a similarity score based on applying a scoring algorithm to the iris feature representation and the one or more reference iris feature representations; and comparing the similarity score to a threshold to provide an indication of whether the iris feature representation and the one or more reference iris feature representations constitute a match; and performing an authentication operation based on the indication of whether the iris feature representation and the one or more reference iris feature representations constitute a match.

12. The method of claim 11, wherein the determined similarity scoring technique comprises a selected scoring algorithm or a modified scoring algorithm relative to a baseline scoring algorithm, to compensate for the discrimination factors of the iris feature representation or the discrimination factors of the one or more reference iris feature representations.

13. The method of claim 11, wherein the determined similarity scoring technique comprises an adjustment of the threshold to compensate for the discrimination factors of the iris feature representation or the discrimination factors of the one or more reference iris feature representations.

14. The method of claim 11, wherein the iris feature representation and the one or more reference iris feature representations are feature vectors that each comprise a plurality of elements at respective vector positions.

15. The method of claim 14, further comprising:

determining, based on one or more quality metrics for respective iris image portions corresponding to the iris feature representation and the one or more reference iris feature representations, respective validities of the elements of the feature vectors at respective vector positions for the iris feature representation and the one or more reference iris feature representations, wherein the discrimination factors include at least a common valid element count, determined based on the determined respective validities of the elements of the iris feature representation and the one or more reference iris feature representations, wherein common valid elements count indicates a number of the vector positions having valid elements for both the iris feature representation and the one or more reference iris feature representations.

16. The method of claim 11, wherein the similarity scoring technique is configured such that a probability that the indication of whether the iris feature representation and the one or more reference iris feature representations constitutes a match produces a false indication of a match is normalized across users or image capture conditions exhibiting the discrimination factors.

17. One or more non-transitory, computer-readable storage media, storing program instructions that, when executed using one or more processors, cause the one or more processors to:

determine, based on discrimination factors of an iris feature representation or one or more reference iris feature representations, a similarity scoring technique; and apply the similarity scoring technique, wherein, to apply the similarity scoring technique, the one or more processors:

produce a similarity score based on applying a scoring algorithm to the iris feature representation and the one or more reference iris feature representations; and compare the similarity score to a threshold to provide an indication of whether the iris feature representation and the one or more reference iris feature representations constitute a match; and perform an authentication operation based on the indication of whether the iris feature representation and the one or more reference iris feature representations constitute a match.

18. The one or more non-transitory, computer-readable storage media of claim 17, wherein the determined similarity scoring technique comprises a selected scoring algorithm or a modified scoring algorithm relative to a baseline scoring algorithm, to compensate for the discrimination factors of the iris feature representation or the discrimination factors of the one or more reference iris feature representations.

19. The one or more non-transitory, computer-readable storage media of claim 17, wherein the determined similarity scoring technique comprises a modification of the threshold to compensate for the discrimination factors of the iris feature representation or the discrimination factors of the one or more reference iris feature representations.

20. The one or more non-transitory, computer-readable storage media of claim 17, wherein the similarity scoring technique is configured such that a probability that the indication of whether the iris feature representation and the one or more reference iris feature representations constitutes a match produces a false indication of a match is normalized across users or image capture conditions exhibiting the discrimination factors.

* * * * *